3,075,010
PREPARATION OF ACID FROM DIOLEFINS
Louis Schmerling, Riverside, and Walter G. Toekelt, Downers Grove, Ill., assignors to Universal Oil Products Company, Des Plaines, Ill., a corporation of Delaware
No Drawing. Filed Jan. 18, 1961, Ser. No. 83,373
10 Claims. (Cl. 260—533)

This application is a continuation-in-part of our copending application Serial No. 739,002, now Patent No. 3,021,367 filed June 2, 1958.

This invention relates to a method for preparing organic compounds of relatively high molecular weight and particularly to a method of preparing relatively high molecular weight organic salts and acids.

More particularly yet the invention is concerned with the preparation of alkali metal salts and alkaline earth metal salts of relatively high molecular weight organic compounds and also the preparation of their corresponding acids.

Relatively high molecular weight organic acids or the alkali metal salts and alkaline earth metal salts thereof find many uses in the chemical field. For example, the higher molecular weight organic acids are used as intermediates in the preparation of esters which in turn are used in the preparation of artificial perfumes and flavors. Furthermore, certain esters may also be used as solvents, especially in the manufacture of quick drying paints and lacquers. In addition the alkali metal salts of the higher molecular weight carboxylic acids may be used in the preparation of soaps and cleansing agents.

It is therefore an object of this invention to provide a method for the preparation of alkali metal and alkaline earth metal salts of higher molecular weight organic acids.

A further object of this invention is to provide a method for the preparation of alkali metal and alkaline earth metal salts of both higher molecular weight mono- and polycarboxylic acids and also a method of preparing the acids themselves.

One embodiment of this invention is found in a process for the preparation of a salt of a carboxylic acid which comprises reacting a polyolefinic hydrocarbon with a compound selected from the group consisting of alkali metal salts of saturated carboxylic acids and alkaline earth metal salts of saturated carboxylic acids, said acids being characterized by the presence of at least one hydrogen atom on an alpha carbon atom, in the presence of a catalyst selected from the group consisting of alkali metals, alkali metal hydrides, alkali metal amides, alkali metal alkyls and alkali metal aryls at condensation conditions, hydrolyzing the resultant product, and recovering the desired salt of a carboxylic acid.

A further embodiment of this invention resides in a process for the preparation of a salt of a carboxylic acid which comprises reacting a diolefinic hydrocarbon with a compound selected from the group consisting of alkali metal salts of saturated carboxylic acids and alkaline earth metal salts of saturated carboxylic acids, said acids being characterized by the presence of at least one hydrogen atom on an alpha carbon atom, in the presence of a catalyst selected from the group consisting of alkali metal, alkali metal amides, alkali metal alkyls and alkali metal aryls at a temperature in the range of from about $50°$ to about $300°$ C., hydrolyzing the resultant product, and recovering the desired salt of a carboxylic acid.

Yet another embodiment of the invention resides in a process for the preparation of a salt of a carboxylic acid which comprises reacting an alkadiene with a sodium salt of a saturated carboxylic acid containing at least one hydrogen atom on an alpha carbon atom, in the presence of a catalyst selected from the group consisting of alkali metals, alkali metal amides, alkali metal alkyls and alkali metal aryls at a temperature in the range of from about $50°$ to about $300°$ C., hydrolyzing the resultant product, and recovering the desired salt of a carboxylic acid.

A still further embodiment of the invention resides in a process for the preparation of a carboxylic acid which comprises reacting a polyolefinic hydrocarbon with a compound selected from the group consisting of alkali metal salts of saturated carboxylic acids and alkaline earth metal salts of saturated carboxylic acids, said acids being characterized by the presence of at least one hydrogen atom on an alpha carbon atom, in the presence of a catalyst selected from the group consisting of alkali metals, alkali metal hydrides, alkali metal amides, alkali metal alkyls and alkali metal aryls at a temperature in the range of from about $50°$ to about $300°$ C., hydrolyzing the resultant product to form the salt of a carboxylic acid, thereafter acidifying the product, and recovering the desired carboxylic acid.

A specific embodiment of the invention is found in a process for the preparation of a salt of a carboxylic acid which comprises reacting butadiene with sodium propionate in the presence of sodamide at a temperature in the range of from about $50°$ to about $250°$ C., hydrolyzing the resultant product, and recovering the desired sodium 2-methylhexanoate and sodium 2,2-bis-(2-butenyl)-propionate.

Another specific embodiment of the invention is found in a process for the preparation of a carboxylic acid which comprises reacting butadiene with sodium propionate in the presence of sodamide at a temperature in the range of from about $150°$ to about $250°$ C., hydrolyzing the resultant product to form sodium 2-methylhexanoate and sodium 2,2-bis-(2-butenyl)-propionate, thereafter acidifying the last two named products, and recovering the desired 2-methylhexanoic acid and 2,2-bis-(2-butenyl)-propionic acid.

Other objects and embodiments referring to alternative alkali metal salts of saturated carboxylic acids, alkaline earth metal salts of saturated carboxylic acids, olefins, catalysts and diluents will be found in the following further detailed description of the invention.

As hereinbefore set forth this invention is concerned with the preparation of alkali metal salts and alkaline earth metal salts of relatively high molecular weight organic acids and also to the preparation of these acids themselves. These compounds are prepared by reacting an olefin with either an alkali metal salt of a saturated carboxylic acid or an alkaline earth metal salt of a saturated carboxylic acid, said acids being characterized by the presence of at least one hydrogen atom on an α-carbon atom, in the presence of certain catalysts hereinafter set forth. The olefins which may be used in this invention include polyolefinic hydrocarbons comprising both straight and branched chain alkadienes containing from 4 to 12 or more, the preferred reactants containing from 4 to 12 carbon atoms. Examples of the alkadienes which may be used include 1,3-butadiene, 1,3-pentadiene, 1,4-pentadiene, 2-methyl-1,3-butadiene (isoprene), 1,3-hexadiene, 1,4-hexadiene, 2-methyl - 1,3 - pentadiene, 3 - methyl - 1,3-pentadiene, 2,3-dimethyl - 1,3 - butadiene, 1,3-heptadiene, 1,4-heptadiene, 1,5-heptadiene, 1,6-heptadiene, 2-methyl-1,3-hexadiene, 2-methyl-1,4-hexadiene, 2-methyl-1,5-hexadiene, 2,3-dimethyl-1,3-pentadiene, 2-ethyl-1,3-pentadiene, 3-ethyl-1,3-pentadiene, etc., the straight and branched chain isomeric octadienes, nonadienes, decadienes, undecadienes, dodecadienes, tridecadienes, tetradecadienes, pentadecadienes, etc. Of the aforementioned alkadienes, butadienes and isoprenes are the preferred reactants due to their relatively greater availability and correspondingly lower cost.

The alkali metal salts or alkaline earth metal salts of saturated carboxylic acids which may be reacted with the olefinic compound hereinbefore set forth include those acids containing at least one hydrogen atom on a carbon atom alpha to a carboxy group, such a carbon atom being referred to as an α-carbon atom for the purposes of this specification and claims. Generic formulae which may be used to describe these acids are as follows:

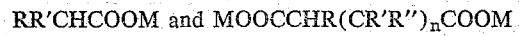

and

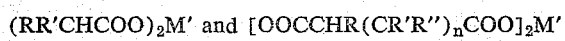

in which R, R' and R" are independently selected from the group consisting of hydrogen, alkyl, cycloalkyl and aryl radicals, M is an alkali metal, M' is an alkaline earth metal and $n$ is an integer of from 0 to about 10. Alkali metal salts or alkaline earth metal salts of acids falling within these generic formulae include sodium acetate, potassium acetate, lithium acetate, cesium acetate, rubidium acetate, calcium acetate, magnetium acetate, barium acetate, strontium acetate, sodium propionate, potassium propionate, lithium propionate, cesium propionate, rubidium propionate, calcium propionate, magnesium propionate, barium propionate, strontium propionate, sodium butyrate, potassium butyrate, lithium butyrate, cesium butyrate, rubidium butyrate, calcium butyrate, magnesium butyrate, barium butyrate, strontium butyrate, the aforementioned alkali metal and alkaline earth metal salts of valerates, hexanoates, heptanoates, octanoates, etc.; sodium cyclohexanecarboxylate, potassium cyclohexanecarboxylate, lithium cyclohexanecarboxylate, cesium cyclohexanecarboxylate, magnesium cyclohexanecarboxylate, calcium cyclohexanecarboxylate, barium cyclohexanecarboxylate, strontium cyclohexanecarboxylate, sodium cyclohexylacetate, potassium cyclohexylacetate, lithium cyclohexylacetate, cesium cyclohexylacetate, magnesium cyclohexylacetate, calcium cyclohexylacetate, barium cyclohexylacetate, strontium cyclohexylacetate, sodium phenylacetate, potassium phenylacetate, lithium phenylacetate, rubidium phenylacetate, cesium phenylacetate, calcium phenylacetate, magnesium phenylacetate, barium phenylacetate, strontium phenylacetate, sodium 1- or 2-phenylpropionate, potassium 1- or 2-phenylpropionate, lithium 1- or 2-phenylpropionate, rubidium 1- or 2-phenylpropionate, cesium 1- or 2-phenylpropionate, calcium 1- or 2-phenylpropionate, magnesium 1- or 2-phenylpropionate, barium 1- or 2-phenylpropionate, strontium 1- or 2-phenylpropionate, the aforementioned alkali metal and alkaline earth metal salts of the phenylbutyrates, phenylvalerates, phenylhexanoates, etc.; sodium malonate, potassium malonate, lithium malonate, cesium malonate, rubidium malonate, calcium malonate, barium malonate, strontium malonate, sodium succinate, potassium succinate, lithium succinate, rubidium succinate, cesium succinate, calcium succinate, magnesium succinate, barium succinate, strontium succinate, sodium glutarate, potassium glutarate, lithium glutarate, rubidium glutarate, cesium glutarate, barium glutarate, calcium glutarate, strontium glutarate, the aforementioned alkali metal and alkaline earth metal adipates, pimelates, suberates, sebacates, etc. For purposes of this invention the aryl substituted acids such as phenylacetic acid, 1- and 2-phenylpropionic acid, etc., are considered as falling within the term "saturated carboxylic acids." Due to the relatively greater availability and relatively lower cost as well as the greater yields which are obtained thereby the sodium and potassium salts of the aforementioned saturated carboxylic acids are the preferred reactants of the present process. It is also considered within the scope of this invention to utilize ammonium salts as starting materials although not necessarily with equivalent results.

Catalysts which are employed in the present process comprise the alkali metals, hydrides and amides thereof, such catalysts including sodium, sodium hydride, sodamide, potassium, potassium hydride, potassium amide, lithium, lithium hydride, lithium amide, rubidium hydride, rubidium amide, cesium, cesium hydride, cesium amide, etc. Mixed hydrides such as lithium aluminum hydride and sodium borohydride may also be used. The catalysts may also comprise an alkali metal derivative of an alkali metal salt of a saturated carboxylic acid or a mixture of the derivative and one of the catalysts hereinbefore set forth. It is also contemplated within the scope of this invention that the alkali metal plus a promoter such as an aromatic hydrocarbon including benzene, toluene, anthracene, etc., or an organic halide such as chlorobenzene, etc., or the alkali metal alkyl or aryl such as pentylsodium, butyllithium, or phenylpotassium, etc., may be used as catalysts for the present invention although not necessarily with equivalent results.

In addition, if so desired, the reaction may be effected in the presence of a substantially inert organic diluent such as saturated aliphatic hydrocarbons including pentane, hexane, heptane, octane, etc.; cyclic and alkyl substituted cyclic hydrocarbons such as cyclopentane, cyclohexane, cycloheptane, etc., methylcyclopentane, methylcyclohexane, methylcycloheptane, etc.; aromatic hydrocarbons such as benzene, toluene, o-, m- and p-xylene, ethylbenzene, etc., may also be used but are usually less preferable inasmuch as they may not be completely inert under the reaction conditions. Tertiary alkyl and aryl amines such as tributylamine and N,N-dimethylaniline may also be employed as diluents as may alkyl and polyalkyl ethers such as dibutyl ether, bis-(ethoxyethyl) ether, etc.

Generally speaking the reaction between the alkali metal salt of a saturated carboxylic acid or the alkaline earth metal salt of a saturated carboxylic acid, said acids being characterized by the presence of at least one hydrogen atom on an α-carbon atom, and a diolefin, in the presence of a catalyst of the type hereinbefore set forth, is effected at a temperature in the range of from about 50° to about 300° C., and preferably at a temperature in the range of from about 150° to about 250° C., the particular temperature being dependent upon the reactants and the catalyst which are used. In addition the reaction will proceed at an elevated pressure, usually in the range of from about 25 to about 200 atmospheres or more. This pressure will generally be supplied by the olefin, if in gaseous form. However, it is also contemplated within the scope of this invention that the pressure may also be supplied by the addition of an inert gas. In each case, however, the pressure will be sufficient to maintain a substantial portion of the reactants in liquid form.

The process of this invention may be effected in any suitable manner and may comprise either a batch or a continuous type operation. For example, when a batch type operation is used a quantity of the alkali metal salt of a saturated carboxylic acid or the alkaline earth metal salt of a saturated carboxylic acid along with the catalyst or the diolefin if in liquid form, and the diluent or solvent, if any is used, is sealed in a suitable apparatus such as, for example, a rotating autoclave. If the diolefin is in gaseous form, it is pressed in, until the desired pressure has been reached, after the autoclave is sealed. The reaction vessel is heated to the desired temperature and maintained thereat for a predetermined period of time after which the autoclave and contents thereof are cooled to room temperature, the excess pressure is vented and the reaction product is recovered by conventional means such as, for example, by dissolving the reaction product in water to hydrolyze said product thereby forming the desired salt of a higher molecular weight organic acid. The aqueous solution may then be extracted with a suitable organic solvent such as ether to separate the diluent and to remove traces of water-insoluble material after which the aqueous solution is concentrated and the desired salt is separated by fractional crystallization. If, as is usually the case, the higher weight molecular acid itself is desired, the aqueous solution is acidified by conventional means using acidifying agents such as inorganic acids including hydrochloric acid, sulfuric acid, nitric acid, etc., and recovered, one method consisting of extraction of the acid with a solvent such as ethyl ether, followed by fractionation of the extract.

The reaction process of the present invention may also be effected in a continuous type manner. In this type of operation the starting materials comprising the alkali metal or alkaline earth metal salt of a saturated carboxylic acid and the diolefin are continuously charged to a reaction zone which is maintained at the proper operating conditions of temperature and pressure and which contains the desired catalyst such as the alkali metal or amide or hydride thereof. The salt of the saturated carboxylic acid and the diolefin, in either liquid or gaseous form, are charged to the reactor through separate lines or, if so desired, may be admixed prior to entry into said reactor and charged thereto in a single stream. Likewise, the solvent or diluent, if one is used, is also continuously charged to the reactor through separate means or, may be admixed with one or the other of the starting materials and charged thereto in a single stream. The reaction zone may comprise an unpacked vessel or coil or may be lined with an adsorbent packing material such as alumina, dehydrated bauxite, fire brick and the like. After a predetermined residence time has elapsed the reaction product is continuously withdrawn from the reactor and separated from diluent and unreacted olefin by conventional means. The unreacted starting materials are recycled to form a portion of the feed stock while the reaction product is then continuously charged to a second reaction zone where said product undergoes hydrolysis by treatment with water which is also being continuously charged to said second reactor. The resulting product is then continuously withdrawn from the second reaction zone and the desired salt of the higher molecular weight organic acid is then separated by conventional means and recovered. If the higher molecular weight organic acid itself is desired, the aforesaid product from the second reaction zone is then continuously charged to yet a third reaction zone where it is acidified by the addition of an acid of the type hereinbefore set forth. The product is continuously withdrawn from this third reaction zone and the higher molecular weight organic acid is recovered by conventional means, such as, for example, fractional distillation, fractional crystallization, etc. Alternatively, the hydrolysis and acidification can be carried out simultaneously in the second zone.

The following examples are given to illustrate the process of the present invention which, however, are not intended to limit the generally broad scope of the present invention in strict accordance therewith.

*Example 1*

A mixture of 30 g. of potassium acetate and 10 g. of sodamide was placed in the glass liner of a rotating autoclave. The glass liner was sealed into the autocalve and 70 g. of 1,3-butadiene charged thereto, the initial pressure being 5 atmospheres. The autoclave was heated to a temperature of 250° C. during a period of 4.5 hours, the maximum pressure reaching 20 atmospheres. At the end of this time the autoclave and contents thereof were cooled to room temperature, the final pressure at room temperature being 5 atmospheres. The excess pressure was vented and the recovered product was dissolved in water yielding an aqueous solution and an upper layer, which were steam-distilled. The aqueous residue was then acidified with hydrochloric acid, extracted with ether and the ether solution was subjected to fractional distillation under reduced pressure. The cut boiling at 77–78° C. at 1.4 mm. pressure comprising a hexanoic acid (mixed with some hexenoic acid) was recovered and analyzed.

Found: C, 62.30; H, 10.26.
Calcd. for $C_6H_{12}O_2$: C, 62.04; H, 10.41;
Calcd. for $C_6H_{10}O_2$: C, 63.13; H, 8.99.

*Example II*

A mixture of 50 g. of sodium propionate and 10 g. of sodamide along with 200 g. of benzene was sealed into a turbomixer which was heated with stirring to 204° C. Butadiene (75 g.) was then added gradually during two hours. The initial pressure was about 17 atmospheres and reached about 27 atmospheres at the end of the addition at which time the temperature was 238° C. Stirring was continued for an additional two hours after which the turbomixer and contents thereof were cooled to room temperature, the excess pressure was vented and the turbomixer was opened. The recovered product was dissolved in water yielding an aqueous layer and an upper layer, which were steam distilled. The aqueous residue was then acidified with hydrochloric acid, extracted with ether, and the ether solution was subjected to fractional distillation under reduced pressure. The cuts boiling at 87° to 150° C. at 4.6 mm. pressure were combined, pentane was added and the solution was washed with water, the solution was dried over sodium sulfate and redistilled through a Minical column. Most of the material boiled at 119–121° C. at 3.2 mm. (about 264–265° C. at atmospheric pressure). Titration with alkali indicated that it had a molecular weight of 178.3; that calculated for a bisbutenylpropionic acid is 182.3. The material was analyzed:

Found: C, 72.30; H, 9.94.
Calcd. for $C_{11}H_{18}O_2$: C, 72.37; H, 9.96.

Some lower-boiling material from this fractionation was again redistilled through the Minical column. Product boiling at 108–110° C. at 26 mm. (204–206° C. at atmospheric pressure) was recovered and analyzed.

Found: C, 64.30; H, 10.13.
Calcd. for $C_7H_{14}O_2$: C, 64.58; H, 10.83;
Calcd. for $C_7H_{12}O_2$: C, 65.60; H, 9.43.

The above analyses clearly indicated that the latter compound comprised 2-methylhexanoic acid mixed with methylhexenoic acid while the former compound comprised 2,2-bis-(2-butenyl)-propionic acid.

*Example III*

In this example a mixture of 50 g. of sodium propionate and 75 g. of isoprene along with 10 g. of sodamide and 200 g. of benzene is placed in a condensation apparatus provided with heating and stirring means. The mixture is gradually heated to a temperature of about 240° C. and maintained thereat for a period of about 5 hours while stirring constantly. At the end of this time the apparatus and contents thereof are allowed to cool to room temperature. The recovered product is dissolved in water thereby yielding an aqueous solution and an upper layer which are steam distilled. The aqueous residue is then acidified with hydrochloric acid, extracted with ether and the ether solution is subjected to fractional distillation under reduced pressure. The cuts comprising the isomeric dimethylhexanoic acids and the isomeric 2,2-bis-(methylbutenyl)-propionic acids are separated and recovered.

We claim as our invention:

1. A process for the preparation of a salt of a carboxylic acid which comprises catalytically reacting an aliphatic di-olefinic hydrocarbon, at a temperature of from about 50° to about 300° C., with a compound selected from the group consisting of alkali metal and alkaline earth metal salts of saturated carboxylic acids having at least one hydrogen atom on an alpha carbon atom, the catalyst in said catalytic reaction being selected from the group consisting of alkali metals, alkali metal hydrides, alkali metal amides, alkali metal alkyls and alkali metal aryls, and hydrolyzing the resultant product.

2. A process for the preparation of a salt of a carboxylic acid which comprises catalytically reacting an aliphatic di-olefinic hydrocarbon, at a temperature of from about 50° to about 300° C., with an alkali metal salt of a saturated carboxylic acid having at least one hydrogen atom on an alpha carbon atom, the catalyst in said catalytic reaction being selected from the group consisting of alkali metals, alkali metal hydrides, alkali metal amides, alkali metal alkyls and alkali metal aryls, and hydrolyzing the resultant product.

3. The process of claim 1 further characterized in that said catalyst is sodamide.

4. The process of claim 1 further characterized in that the hydrolyzed product is acidified.

5. A process for the preparation of a salt of a carboxylic acid which comprises catalytically reacting 1,3-butadiene with potassium acetate in the presence of sodamide as catalyst at a temperature in the range of from about 150° to about 250° C., hydrolyzing the resultant product, and recovering sodium hexanoate and sodium 2,2-bis-(2-butenyl)acetate.

6. A process for the preparation of a carboxylic acid which comprises catalytically reacting 1,3-butadiene with sodium acetate in the presence of sodamide as catalyst at a temperature in the range of from about 150° to about 250° C., hydrolyzing the resultant product to form sodium hexanoate and sodium 2,2-bis-(2-butenyl)acetate, thereafter acidifying the last two named products, and recovering hexanoic acid and 2,2-bis-(2-butenyl)acetic acid.

7. A process for the preparation of a salt of a carboxylic acid which comprises catalytically reacting 1,3-butadiene with sodium propionate in the presence of sodamide as catalyst at a temperature in the range of from about 150° to about 250° C., hydrolyzing the resultant product, and recovering sodium 2-methylhexanoate and sodium 2,2-bis-(2-butenyl)proprionate.

8. A process for the preparation of a carboxylic acid which comprises catalytically reacting 1,3-butadiene with sodium propionate in the presence of sodamide as catalyst at a temperature in the range of from about 150° to about 250° C., hydrolyzing the resultant product to form sodium 2-methylhexanoate and sodium 2,2-bis-(2-butenyl)propionate, thereafter acidifying the last two named products, and recovering 2-methylhexanoic acid and 2,2-bis-(2-butenyl)propionic acid.

9. A process for the preparation of a salt of a carboxylic acid which comprises catalytically reacting 2-methyl-1,3-butadiene with sodium propionate in the presence of sodamide as catalyst at a temperature in the range of from about 150° to about 250° C., hydrolyzing the resultant product, and recovering isomeric sodium dimethylhexanoates and isomeric sodium 2,2-bis-(methylbutenyl)propionates.

10. A process for the preparation of a carboxylic acid which comprises catalytically reacting 2-methyl-1,3-butadiene with sodium propionate in the presence of sodamide as catalyst at a temperature in the range of from about 150° to about 250° C., hydrolyzing the resultant product to form isomeric sodium dimethylhexanoates and isomeric sodium 2,2-bis-(methylbutenyl)propionates, thereafter acidifying the last two named products, and recovering isomeric dimethylhexanoic acids and isomeric 2,2-bis-(methylbutenyl)propionic acids.

References Cited in the file of this patent
UNITED STATES PATENTS
3,021,367    Schmerling et al. _____ Feb. 13, 1962